(12) United States Patent
Takahashi et al.

(10) Patent No.: US 10,411,226 B2
(45) Date of Patent: Sep. 10, 2019

(54) METAL-AIR BATTERY

(71) Applicant: FUJIKURA RUBBER LTD., Koto-ku, Tokyo (JP)

(72) Inventors: Masaki Takahashi, Saitama (JP); Tsutomu Narita, Saitama (JP); Yoshiharu Nakajima, Tokyo (JP); Hiroshi Sakama, Saitama (JP)

(73) Assignee: FUJIKURA RUBBER LTD., Tokyo (JP)

( * ) Notice: Subject to any disclaimer, the term of this patent is extended or adjusted under 35 U.S.C. 154(b) by 213 days.

(21) Appl. No.: 15/528,987

(22) PCT Filed: Jul. 28, 2016

(86) PCT No.: PCT/JP2016/072226
§ 371 (c)(1),
(2) Date: May 23, 2017

(87) PCT Pub. No.: WO2017/149797
PCT Pub. Date: Sep. 8, 2017

(65) Prior Publication Data
US 2018/0076425 A1    Mar. 15, 2018
US 2018/0323411 A9    Nov. 8, 2018

(30) Foreign Application Priority Data

Mar. 1, 2016  (JP) .................. 2016-039125

(51) Int. Cl.
*H01M 2/10* (2006.01)
*H01M 2/12* (2006.01)
(Continued)

(52) U.S. Cl.
CPC ............ *H01M 2/10* (2013.01); *H01M 2/12* (2013.01); *H01M 2/36* (2013.01); *H01M 2/38* (2013.01);
(Continued)

(58) Field of Classification Search
None
See application file for complete search history.

(56) References Cited

U.S. PATENT DOCUMENTS 4,871,627 A    10/1989  Strong
2005/0238949 A1*  10/2005  Morris .................... H01M 2/40
429/113

(Continued)

FOREIGN PATENT DOCUMENTS

JP    57-185170       11/1982
JP    62-177873 A      8/1987
(Continued)

OTHER PUBLICATIONS

Japanese Official Action dated Mar. 14, 2017 corresponding to JP 2017-503185. See attached English translation.

(Continued)

*Primary Examiner* — Alix E Eggerding
(74) *Attorney, Agent, or Firm* — McCormink, Paulding & Huber LLP (57) ABSTRACT

It is an object to provide a metal-air battery capable of, in particular, properly discharging produced gas externally, and performing rapid water supply. A metal-air battery according to the present invention is characterized by including a unit body including a plurality of metal-air battery cells; a water supply space provided on a top surface of the unit body and is common to the metal-air battery cells; and a wiring opening which communicably connects with the water supply space and from which wires connected to electrodes of the metal-air battery cells are drawn out. A tubular portion having the wiring opening projects from the top surface of the unit body.

20 Claims, 5 Drawing Sheets

(51) Int. Cl.
  *H01M 2/36* (2006.01)
  *H01M 12/06* (2006.01)
  *H01M 12/08* (2006.01)
  *H01M 2/38* (2006.01)
  *H01M 4/02* (2006.01)

(52) U.S. Cl.
  CPC ......... *H01M 12/06* (2013.01); *H01M 12/065* (2013.01); *H01M 12/08* (2013.01); *B01D 2256/12* (2013.01); *C01B 2210/0062* (2013.01); *H01M 2004/024* (2013.01); *Y02E 60/128* (2013.01)

(56) References Cited

U.S. PATENT DOCUMENTS

| | | | | |
|---|---|---|---|---|
| 2007/0141464 | A1* | 6/2007 | Huang | H01M 4/12 429/218.2 |
| 2008/0096061 | A1* | 4/2008 | Burchardt | H01M 4/8652 429/405 |
| 2008/0124599 | A1 | 5/2008 | Baik | |
| 2010/0255375 | A1* | 10/2010 | Jiang | H01M 2/1646 429/231.5 |
| 2013/0309584 | A1 | 11/2013 | Ryou | |
| 2016/0141657 | A1* | 5/2016 | Nagano | H01M 8/04156 429/414 |

FOREIGN PATENT DOCUMENTS

| | | |
|---|---|---|
| JP | 63-126179 | 5/1988 |
| JP | 2002-151167 | 5/2002 |
| JP | 2005-527069 | 9/2005 |
| JP | 2013-214472 A | 10/2013 |
| JP | 2013-214473 | 10/2013 |
| JP | 2014-507766 A | 3/2014 |
| JP | 2015-099740 | 5/2015 |
| JP | 2015-207492 A | 11/2015 |
| JP | 2016-152133 A | 8/2016 |
| KR | 1020070101329 A | 10/2007 |
| KR | 1020110109141 A | 10/2011 |
| KR | 1020120029320 A | 3/2012 |
| WO | 2012-066962 A1 | 5/2012 |

OTHER PUBLICATIONS

International Search Report for Application No. PCT/JP2016/072226.

* cited by examiner

METAL-AIR BATTERY

CROSS-REFERENCE TO RELATED APPLICATION

This application is entitled to the benefit of and incorporates by reference subject matter disclosed in the International Patent Application No. PCT/JP2016/072226 filed on Jul. 28, 2016 and Japanese Patent Application No. 2016-039125 filed on Mar. 1, 2016.

TECHNICAL FIELD

The present invention relates to a metal-air battery having a plurality of metal-air battery cells.

BACKGROUND ART

In metal-air batteries, oxygen contained in the atmosphere is used as a cathode active material so that an oxidation-reduction reaction with the oxygen takes place at an air electrode as a cathode. On the other hand, an oxidation-reduction reaction with a metal takes place at a metal electrode as an anode. Metal-air batteries have high energy density and have expectations for serving as emergency power supplies, etc., at the time of a disaster, or the like. Such metal-air batteries that have expectations for serving as emergency power supplies, or the like, are generally configured of a plurality of metal-air battery cells in accordance with a desired electrical output and start generating power upon an electrolytic solution being filled into each metal-air battery cell.

A desired output can be gained by connecting and unitizing a plurality of metal-air battery cells. The structure of a battery unit is disclosed in each of the following patent literatures Japanese Unexamined Patent Publication No. 2013-214472, Japanese Unexamined Patent Publication No. 2013-214473, and Japanese Unexamined Patent Publication No. S62-177873.

SUMMARY

Incidentally, sometimes produced gas such as hydrogen occurs during cell reaction, and there are concerns that this produced gas may cause a reduction in power due to inhibition of the cell reaction caused by the accumulation of the produced gas in the cells, and that the metal-air battery cells may be damaged due to a rise of the internal pressure of the cells especially when the produced gap occurs by a great amount. Therefore, a structure for properly discharging the produced gas to the outside has been required.

Additionally, conventional metal-air batteries equipped with a plurality of metal-air battery cells are required to be constructed so that each metal-air battery cell can be supplied with water in a quick manner because water needs to be supplied into each metal-air battery cell. Accordingly, metal-air batteries are expected to be used in emergency situations, such as a disaster situation, thus being required to be constructed so that a plurality of metal-air battery cells can be supplied with an electrolytic solution as quick and easy as possible.

The present invention has been devised in view of the above described issues, and it is an object of the present invention to provide a metal-air battery which, in particular, can properly discharge produced gas externally and can be supplied with water rapidly.

The present invention is characterized by a metal-air battery, including a unit body including a plurality of metal-air battery cells; a water supply space provided on a top surface of the unit body, the water supply space being common to the metal-air battery cells; and a wiring opening which communicably connects with the water supply space and from which wires connected to electrodes of the metal-air battery cells are drawn out.

In the present invention, it is desirable for a tubular portion, provided with the wiring opening, to project from the top surface of the unit body.

Additionally, in the present invention, it is desirable for the wiring opening to be provided at a position higher than a full water level of an electrolytic solution supplied in the water supply space.

Additionally, in the present invention, it is desirable for an electrical system space for controlling a battery output to be provided on the top surface of the unit body, and for the wiring opening to be provided at a position higher than a base surface of the electrical system space.

Additionally, in the present invention, it is desirable for the water supply space and an electrical system space for controlling a battery output to be provided on a unitarily-formed upper case or on separate upper cases.

Additionally, in the present invention, it is desirable for a surface of the upper case on which the electrical system space is positioned to be provided with a layout area for an external connection terminal.

Additionally, in the present invention, it is desirable for the metal-air battery cells and the upper case to be separately provided. The metal-air battery cells are each assembled to form the unit body. The upper case is installed onto the top surface of the unit body.

Additionally, in the present invention, it is desirable for a lid to be provided on an upper surface of the upper case so that at least the water supply space is partly exposed.

According to a metal-air battery of the present invention, produced gas such as hydrogen that is evolved by cell reaction can be externally discharged, and rapid water supply can be carried out.

DETAILED DESCRIPTION

An embodiment according to the present invention (hereinafter referred simply as "embodiment") will be discussed in detail hereinafter. The present invention is not limited to the embodiment which will be discussed below; various modifications to this embodiment are possible within the scope of the invention.

Figure 1:
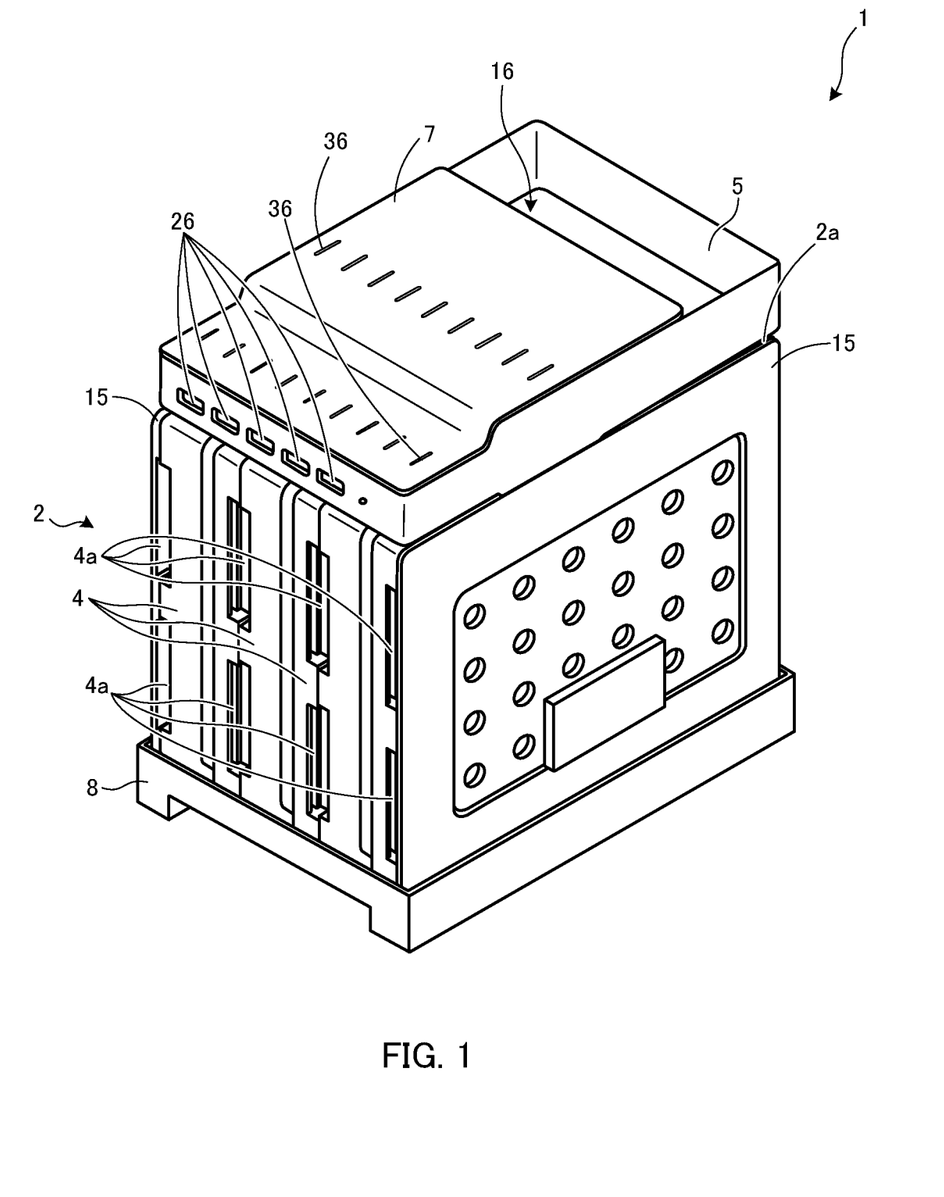
FIG. 1 is a perspective view of a metal-air battery of an embodiment according to the present invention.
Figure 2:
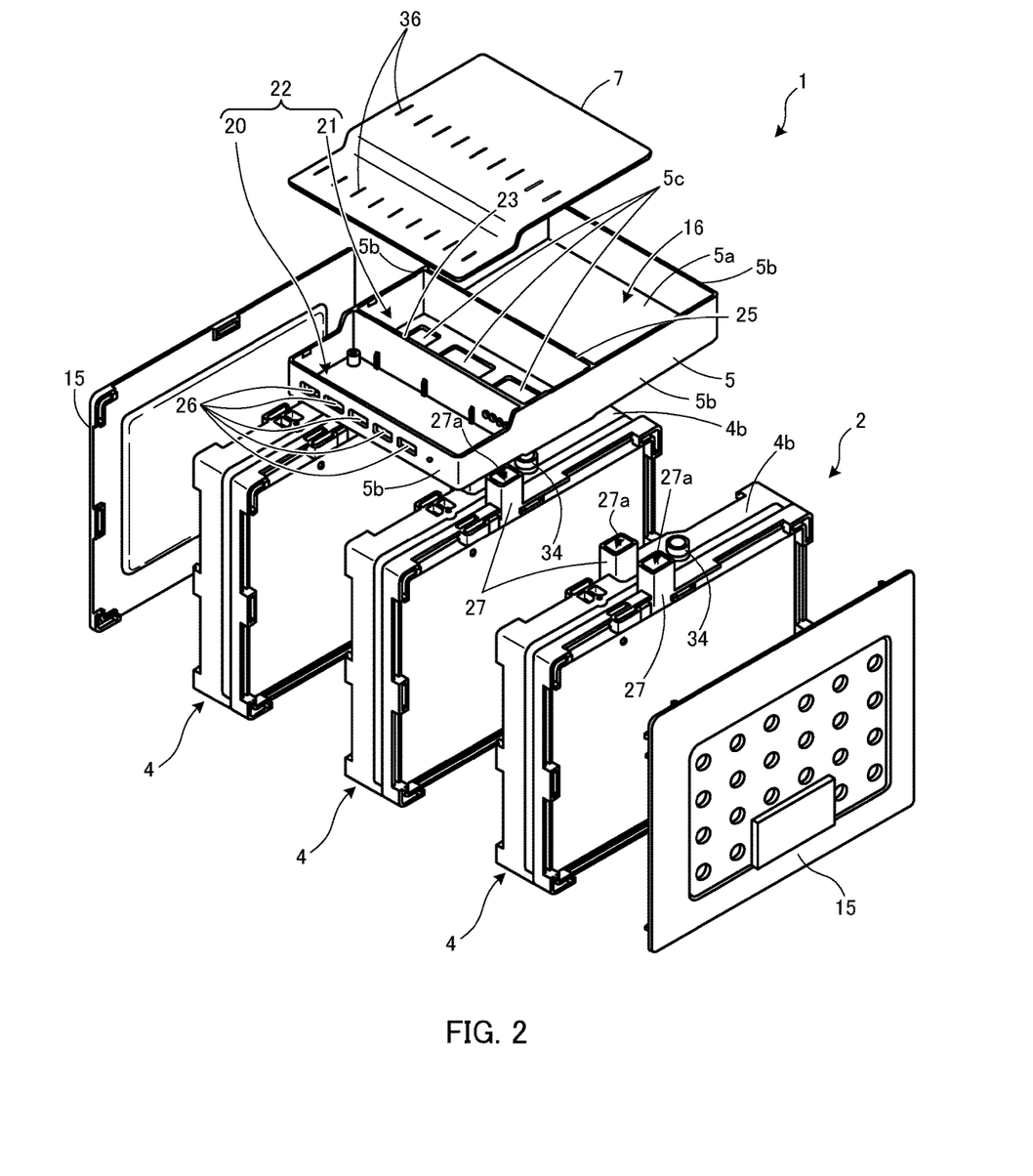
FIG. 2 is an exploded perspective view of the metal-air battery of the embodiment according to the present invention.
Figure 3:
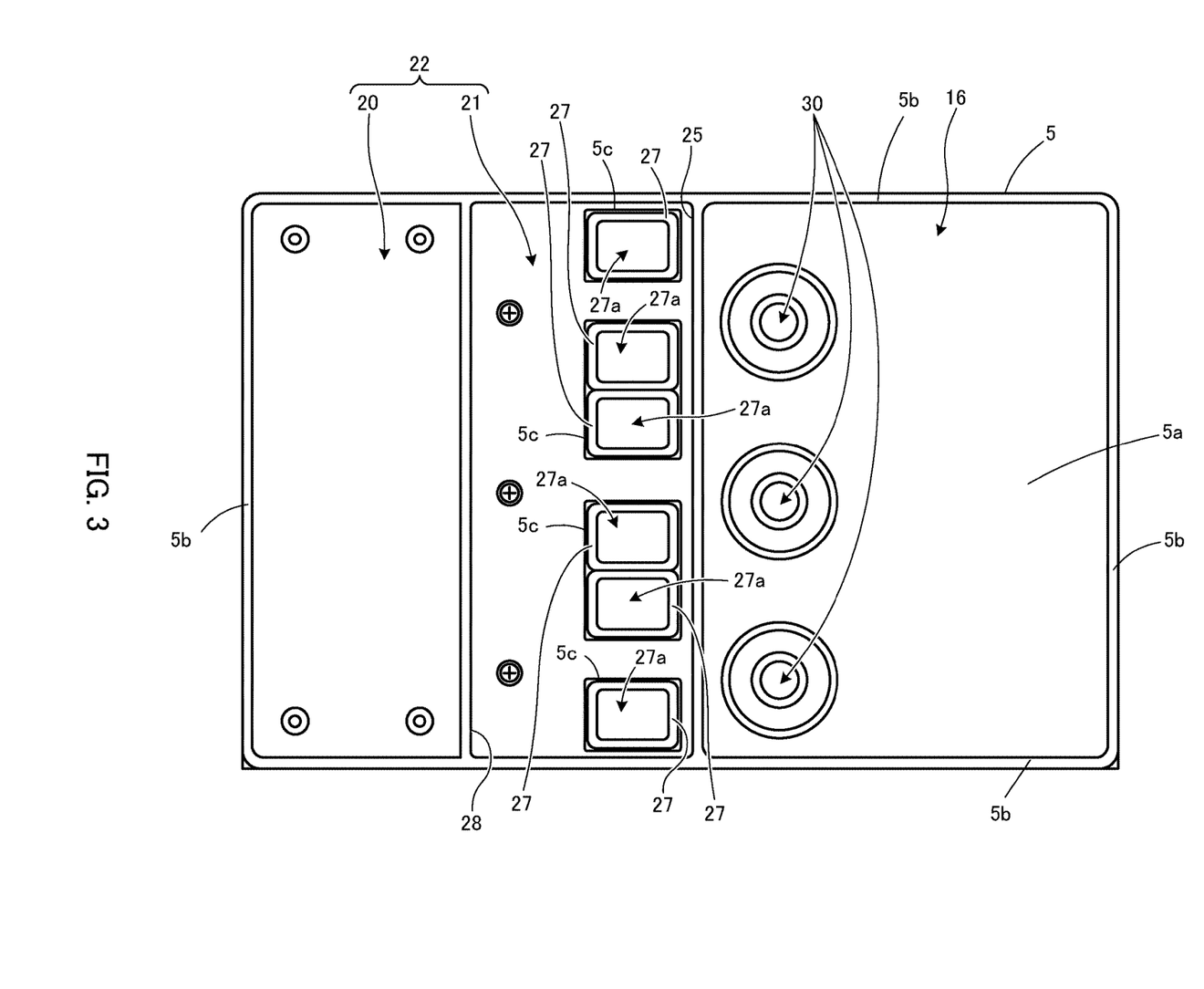
FIG. 3 is a plan view of the metal-air battery of the embodiment according to the present invention.
Figure 4:
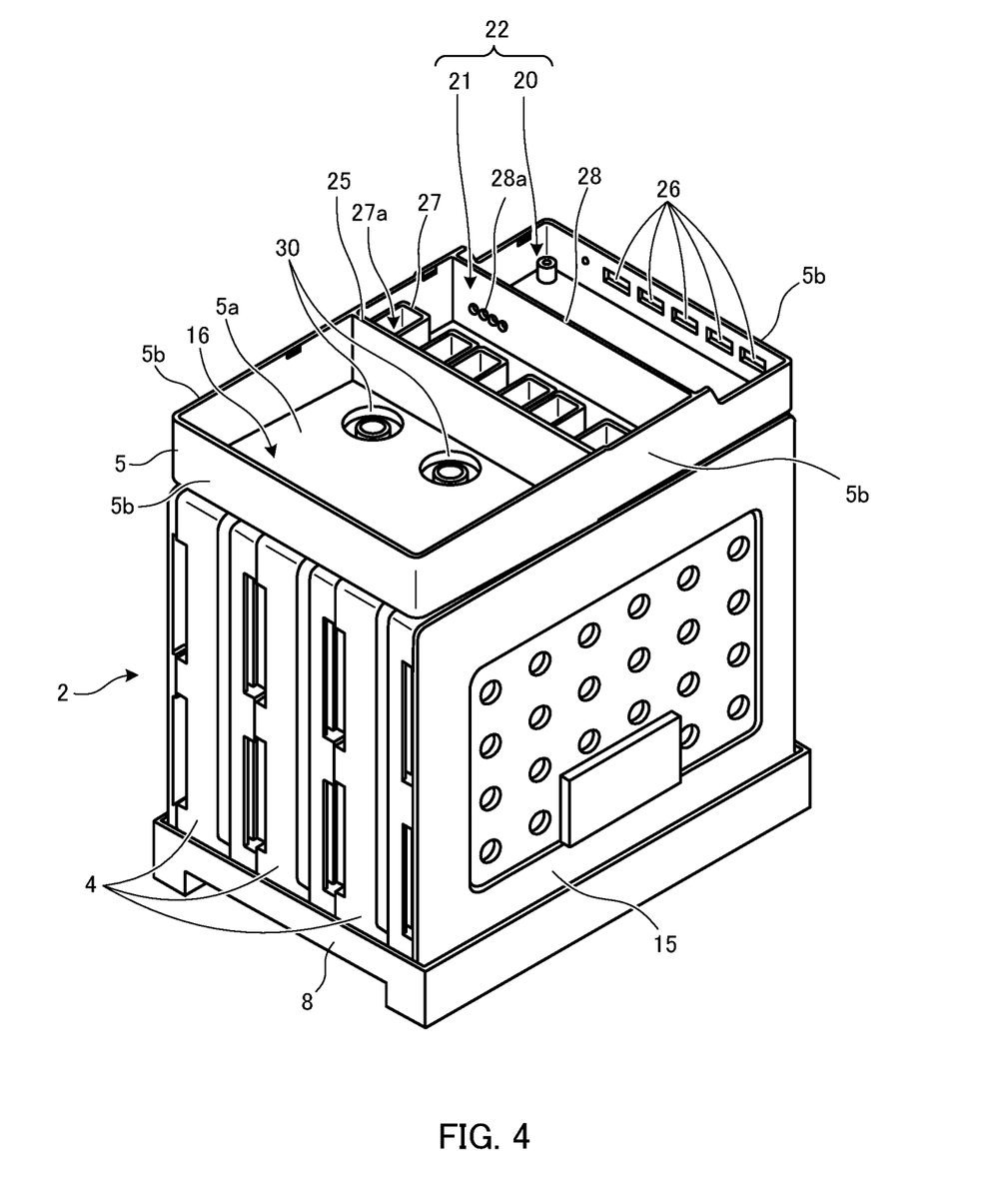
FIG. 4 is a perspective view of the metal-air battery of the embodiment according to the present invention with a lid which is shown in FIG. 1 removed.

FIG. 1 is a perspective view of a metal-air battery of an embodiment according to the present invention. FIG. 2 is an exploded perspective view of the metal-air battery of the embodiment according to the present invention. FIG. 3 is a plan view of the metal-air battery of the embodiment according to the present invention. FIG. 4 is a perspective view of the metal-air battery of the embodiment according to the present invention with a lid which is shown in FIG. 1 removed. The perspective view of FIG. 4 is a diagram viewed from the direction rotated horizontally by 180 degrees with respect to that of FIG. 1 with the lid removed from the battery shown in FIG. 1.

As shown in FIG. 1, the metal-air battery 1 is provided with a unit body 2, in which a plurality of metal-air battery cells 4 are disposed onto a cell base 8. Although the number of the metal-air battery cells 4 is three in the structure shown in FIG. 1, this does not limit the number of the metal-air battery cells 4. The number of the metal-air battery cells 4 that are connected can be specified in accordance with a desired electrical output. As shown in FIG. 1, the metal-air battery cells 4 are arranged in parallel with void spaces 4a provided there between.

In the embodiment shown in FIG. 1, protectors 15 are disposed on outer surfaces of the metal-air battery cells 4 at either side of the battery 1. In addition, void spaces 4a are also provided between the metal-air battery cells 4 and the protectors 15.

Figure 5:
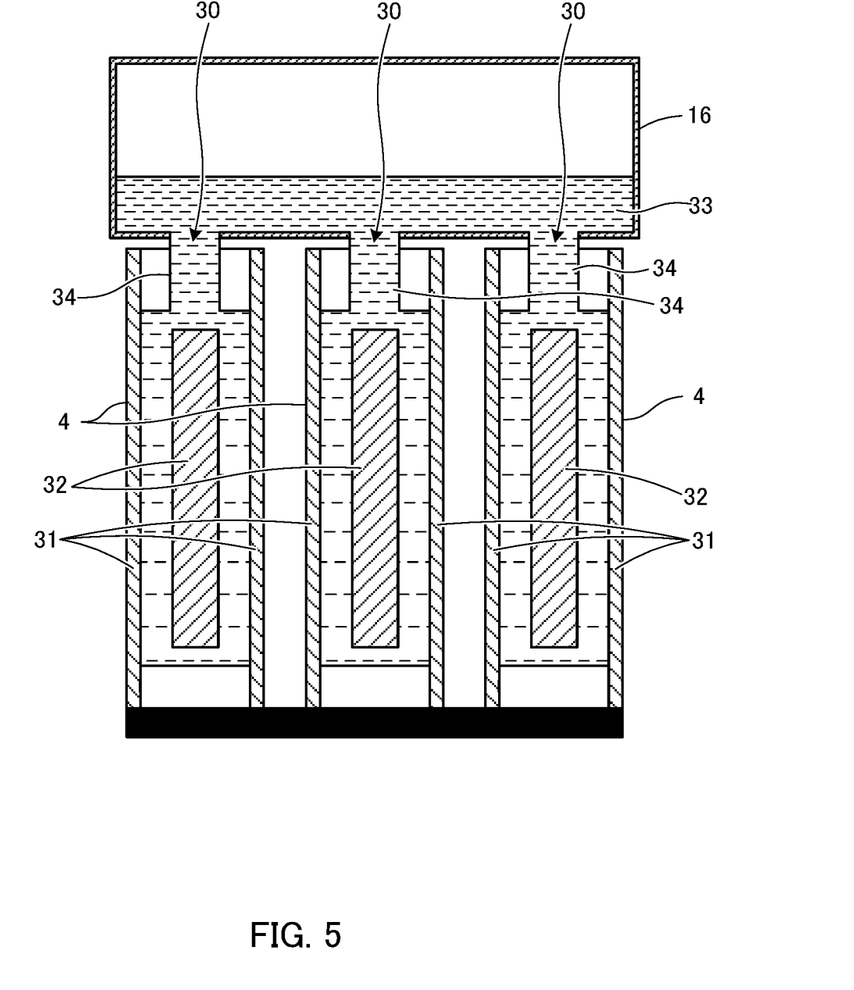
FIG. 5 is a diagram illustrating a simplified cross section of the metal-air battery.

The internal structure of the metal-air battery cells 4 will be hereinafter discussed with reference to FIG. 5. FIG. 5 shows a simplified illustration of the metal-air battery cells 4 that are shown in FIG. 1, and the metal-air battery cells 4 shown in FIG. 1 do not match in shape or size, etc., with those shown in FIG. 5.

As shown in FIG. 5, each metal-air battery cell 4 is configured to have positive electrodes (air electrode) 31 and a negative electrode (metal electrode) 32. A predetermined clearance (gap) is provided between the positive electrodes 31 and the negative electrode 32. As shown in FIG. 5, the negative electrode 32 is positioned inside the positive electrodes 31. The positive electrodes 31 are exposed to the outer surface of each metal-air battery cell 4. Two positive electrodes 31 and one negative electrode 32 are arranged at each metal-air battery cell 4 in FIG. 5; however, this is a mere example, thus not limiting the number of the positive or negative electrodes.

As shown in FIG. 5, the positive electrodes 31 and the negative electrode 32 of each metal-air battery cell 4 face each other via an electrolytic solution 33. Each of the positive and negative electrodes 31 and 32 are in contact with the electrolytic solution 33.

The formation of the void spaces 4a that are shown in FIG. 1 allows the positive electrodes 31 that are arranged at either side of each metal-air battery cell 4 to be exposed to the air. It is also possible to omit the protectors 15 at either side of the unit body 2. However, the installation of the protectors 15 makes it possible to protect the positive electrodes 31 disposed on the external surfaces of the metal-air battery cells 4 positioned at either side of the battery 1.

The structure of the metal-air battery cells 4 in the present embodiment is not limited particularly to the above described structure; any known configuration having positive and negative electrodes is applicable.

As shown in FIG. 1, an upper case 5 is mounted onto a top surface 2a of the unit body 2. As shown in FIGS. 2, 3 and 4, the upper case 5 is configured of a base surface 5a, and side surfaces 5b which are provided to stand upright from the sides of the base surface 5a, respectively. The top side of the upper case 5 is open.

The upper case 5 is provided with a water supply space 16 which supplies the electrolytic solution 33 to each metal-air battery cell 4, and an electrical system space 22 which is electrically connected to the positive electrodes 31 and the negative electrode 32 of each metal-air battery cell 4 to control the output of the battery.

As shown in FIGS. 2, 3 and 4, a wall 25 is provided between the water supply space 16 and the electrical system space 22 and stands upright from the base surface 5a. The height of the wall 25 is nearly equal to, e.g., the height of the side surfaces 5b. The formation of the wall 25 makes it possible to prevent the electrolytic solution 33 that is supplied into the water supply space 16 from flowing to the electrical system space 22 side.

<Water Supply Space>

As shown in FIGS. 3 and 4, a plurality of water supply holes 30 are formed on the base surface of the water supply space 16. As shown in FIG. 5, the water supply holes 30 are connected to water supply ports 34 (see FIG. 2 also) which are formed on top surfaces 4b of the metal-air battery cells 4, respectively.

As described above, the water supply space 16 serves as a common water supply space for the metal-air battery cells 4 that includes the plurality of water supply holes 30. Accordingly, the electrolytic solution 33 can be supplied into the metal-air battery cells 4 in a single batch. Hence, in the present embodiment, since water can be supplied into the metal-air battery cells 4 in a single batch, the electrolytic solution 33 can be poured into the metal-air battery cells 4 simultaneously by substantially equal amounts. This makes it possible to obtain a desired electrical output stably and sustainably. In addition, compared with a conventional method of supplying water into each metal-air battery cell, the water supply in a single batch makes it possible to supply water easily and quickly in emergency situations such as in a disaster situation.

<Wiring Openings>

As shown in FIG. 2, each metal-air battery cell 4 is provided on the top surface 4b thereof with tubular portions 27 which penetrate inside the cell, in which the positive electrodes 31 and the negative electrode 32 are arranged. Wiring openings 27a are formed on tops of the tubular portions 27. From each wiring opening 27a, wires which are connected to the positive and negative electrodes 31 and 32 are externally drawn out therefrom.

The wiring openings 27a communicably connect with the water supply space 16. Namely, the water supply space 16 is communicably connected, from the water supply holes 30 that is provided in the water supply space 16, with the inside of each cell (see FIG. 5) that includes the water supply port 34, the positive electrodes 31 and the negative electrode 32, and also with the tubular portions 27. Accordingly, when the electrolytic solution 33 is supplied into the water supply space 16, the wiring openings 27a serve as vent holes, which makes it possible to let the air in each cell escape from the wiring openings 27a, thereby making it possible to supply water into each metal-air battery cell 4 in a quick manner.

Although the number of the wiring openings 27a is equal to the number of the positive electrodes 31 in the present embodiment, this does not limit the number of the wiring openings 27a. For instance, the wires can be tied in a bundle at each metal-air battery cell 4 and externally drawn from one wiring opening 27a with respect to each metal-air battery cell 4.

As shown in FIG. 2, a plurality of holes 5c are formed through the base surface 5a of the upper case 5 at positions facing the tubular portions 27 that have the wiring openings 27a. When the upper case 5 is mounted to the top surface 2a of the unit body 2, the tubular portions 27 pass through the holes 5c to come out in the upper case 5 as shown in FIGS. 3 and 4. As shown in FIG. 4, the tubular portions 27 in the upper case 5 are made slightly smaller in height than the side surfaces 5b of the upper case 5.

According to the present embodiment, the wiring openings 27a function not only as openings from which the wires connected to the positive electrodes 31 and the negative electrodes 32 are drawn out, but also as vent holes through which produced gas such as hydrogen that is evolved by cell reaction is externally discharged. Accordingly, without produced gas such as hydrogen that is evolved by cell reaction not remaining in the cells, the produced gas can be externally discharged through the spaces which are communicably connected to the wiring openings 27a from the insides of the cells.

As described above, in the preset embodiment, the wiring openings 27a not only function as openings from which the wires connected to the positive electrodes 31 and the negative electrodes 32, which constitute elements of the metal-air battery cells 4, are drawn out, but also promote rapid water supply to each metal-air battery cell 4 from the water supply space 16 and undertake a role of externally discharging produced gas such as hydrogen that is evolved by cell reaction.

Hence, according to the present invention, the electrolytic solution can be quickly and easily supplied into the plurality of metal-air battery cells 4 in a single batch; additionally, when a drop in output occurs caused by inhibition of the cell reaction due to produced gas or when a large amount of produced gas occurs, damage to the metal-air battery cells 4 which may be caused by a rise in the internal pressure thereof can be prevented, and the metal-air battery 1 of the present embodiment is effectively applicable as an emergency power supply, etc., at the time of a disaster situation, or the like.

In the present embodiment, it is desirable that the wiring openings 27a be provided at positions higher than the full water level of the electrolytic solution 33 supplied in the water supply space 16. The term "full water" refers to the state where the water level of the electrolytic solution 33 in the water supply space 16 is the highest when the electrolytic solution 33 is supplied in the water supply space 16 (see FIG. 5). Setting the wiring openings 27a at positions higher than the water level of the electrolytic solution 33 supplied in the water supply space 16 in this manner makes it possible to prevent the electrolytic solution 33 from entering from the wiring openings 27a. In addition, even if the electrolytic solution 33 is excessively poured into the water supply space 16 by mistake, if the positions of the wiring openings 27a are higher than the water level of the electrolytic solution 33, an adverse influence caused by an overflow of the wiring openings 27a can be adequately prevented from being exerted on the electrical system, such as a board, etc., installed in the electrical system space 22.

In addition, it is desirable that the wiring openings 27a be provided at positions higher than the base surface of the electrical system space 22. As shown in FIG. 4, the tubular portions 27 project into the upper case 5 to be positioned higher than the base surface of the electrical system space 22. This makes it possible to prevent produced gas such as hydrogen that is evolved by cell reaction from remaining in the electrical system space 22 when the produced gas is externally discharged from the wiring openings 27a, thus making it possible to reduce influence on the electrical system.

<Electrical System Space>

As shown in FIGS. 2, 3 and 4, the upper case 5 is provided with the electrical system space 22. Although the electrical system space 22 is formed integral with the upper case 5, with which the water supply space 16 is formed integral, in the present embodiment, the electrical system space 22 and the water supply space 16 can be provided in separate upper cases.

The electrical system space 22 can be configured of, e.g., a wire space 21 which accommodates the wires drawn out from each metal-air battery cell 4, and a board space 20 which accommodates a board for controlling the output of the battery. The wires accommodated in the wire space 21 are electrically connected to the board installed in the board space 20.

As shown in FIGS. 3 and 4, a wall 28 which stands upright from the base surface is provided between the wire space 21 and the board space 20. For instance, the wall 28 is provided with a plurality of insertion holes 28a as shown in FIG. 4, and the wires drawn out from each wiring opening 27a can be routed to the board space 20 through the insertion holes 28a and connected to the board installed in the board space 20. The way to route the wires from the wire space 21 to the board space 20 is not limited to the above described routing; instead of providing the insertion holes 28a, it is possible to provide intermittently-arranged walls between the wire space 21 and the board space 20 to route the wires between these walls, or to provide depressed portions on the wall to route the wires through these depressed portions, or to decrease the height of the wall to route the wires over the wall.

Although the wire space 21 and the board space 20 are formed in the upper case 5 that is provided as a unitarily formed member in the present embodiment, the wire space 21 and the board space 20 can be provided on separate upper cases.

<External Connection Holes>

As shown in FIGS. 1 and 4, the upper case 5 is provided with external connection holes 26 on one side surface 5b thereof. External connection terminals (not shown) for externally supplying the output of the battery are installed through the external connection holes 26. In addition, by connecting an external device such as a portable device to the external connection terminals, charging, etc., for this external device can be easily carried out. The external connection holes 26 are provided as layout areas for the external connection terminals on a portion of the upper case 5 which defines a side of the electrical system space 22. The layout areas for the external connection terminals do not have to be provided as holes, and can be configured to be capable of properly supporting the external connection terminals and to be suitable for connection to an external device. Nevertheless, providing the layout areas for the external connection terminals as holes allows the upper case 5 to properly support the external connection terminals and enables the external connection terminals to be externally exposed from a side of the upper case by fitting the external connection terminals into the holes, thus making it possible achieve a configuration suitable for connection to an external device.

Although a total of five external connection holes 26 are provided in FIG. 4, the number of the external connection holes 26 is not limited to five. The number of the external connection holes 26 can be one or more than one. If the number of the external connection holes 26 is more than one, more than one external connection terminal can be installed, which makes it possible to perform charging, etc., on more than one external device at the same time. The number of the external connection holes 26 can be appropriately set to correspond to the electrical output required for the external connection terminal(s).

<Lid>

As shown in FIG. 1, a lid 7 is provided on top of the upper case 5. As shown in FIG. 1, the upper case 5 is not fully covered by the lid 7, and the water supply space 16 is partly open. Accordingly, water can be supplied from this open part of the water supply space 16. In addition, providing the wall 25 (see FIGS. 3 and 4) between the water supply space 16 and the electrical system space 22 and providing the lid 7 makes it possible to prevent the electrolytic solution 33 from flowing into the electrical system space 22.

The lid 7 covers the top of the electrical system space 22, thus being capable of adequately protecting the electrical system from the outside.

The lid 7 is provided with a plurality of vent holes 36, as shown in FIGS. 1 and 2. In addition, as shown in FIG. 4, the tubular portions 27 that are provided with the wiring openings 27a are slightly smaller in height than the side surfaces 5b of the upper case 5. Therefore, the produced gas such as hydrogen which is discharged from the wiring openings 27a neither remains in the electrical system space 22 nor returns into the cells, thus being properly discharged externally from the metal-air battery 1 through the vent holes 36 of the lid 7.

<Assembly>

In the present embodiment, the plurality of metal-air battery cells 4 are independently provided as shown in FIG. 2. Each metal-air battery cell 4 is provided on the top surface 4b thereof with one water supply port 34 and two tubular portions 27, each of which has one wiring opening 27a. In addition, the meta-air battery cells 4 are provided therebetween on mutually-facing circumferential portions thereof with connecting portions such as projection-depression fitting portions, and the metal-air battery cells 4 and the protectors 15 can be assembled together via the connecting portions to be installed on the cell base 8; thereby simplifying the configuration of the unit body 2.

Additionally, the metal-air battery 1 that is shown in FIG. 1 can be completed by installing the upper case 5, which is a common case for the metal-air battery cells 4, onto the top surface 2a of the unit body 2, and by further installing the lid 7 onto the upper case 5. This increases the degree of freedom in setting the number of connections between the metal-air battery cells 4 and makes it possible to easily arrange the water supply space 16 and the electrical system space 22, which are common to the metal-air battery cells 4, on the top surface 2a of the unit body 2.

Although the tubular portions 27 that include the wiring openings 27a are provided on the top surfaces 4b of the metal-air battery cells 4 in the above description, the tubular portions 27 can be provided on side surfaces, etc., of the metal-air battery cells 4. In this case, it is desirable to form the tubular portions 27 by either making the tubular portions 27 extend obliquely upward so that the wiring openings 27a face upward, or by bending the tubular portions 27 at midpoint so that the wiring openings 27a face upward, and to form the wiring openings 27a at positions higher than the full water level of the electrolytic solution 33 supplied in the water supply space. However, the formation of the tubular portions 27, which have the wiring openings 27a, on the top surface 4b of each metal-air battery cell 4 makes it possible to properly promote the discharge of the produced gas and the water supply in a single batch with a simple structure.

According to a metal-air battery of the present invention, produced gas such as hydrogen that is evolved by cell reaction can be properly discharged externally, and an electrolytic solution can be rapidly supplied in a single batch to a plurality of metal-air battery cells. Accordingly, a metal-air battery according to the present embodiment can be effectively applied as an emergency power supply, etc., at the time of a disaster situation, or the like.

This application is based on Japanese Unexamined Patent Application No. 2016-039125, filed on Mar. 1, 2016, the contents of which are all incorporated herein by reference in their entirety.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A metal-air battery, comprising:
a unit body including a plurality of metal-air battery cells;
a water supply space provided on a top surface of said unit body, said water supply space being communicably connected in common with said metal-air battery cells; and
a plurality of wiring openings, provided on top surfaces of the metal-air battery cells, respectively, from which wires connected to electrodes of the metal-air battery cells are drawn out,
wherein an upper case is mounted onto a top surface of the unit body,
wherein the upper case is provided with the water supply space,
wherein the wiring openings are exposed in the upper case at locations that are separated from the water supply space by a wall, and
wherein the water supply space is communicably connected with the wiring openings via insides of the metal-air battery cells, respectively.

2. The metal-air battery according to claim 1, wherein a tubular portion, provided with each wiring opening, projects from said top surface of said unit body to thereby expose the wire openings in the upper case.

3. The metal-air battery according to claim 1, wherein said wiring openings are provided at a position higher than a full water level of an electrolytic solution supplied in said water supply space.

4. The metal-air battery according to claim 1, wherein the upper case is provided with an electrical system space, for controlling a battery output, at a location separated from the water supply space by a wall, and
wherein said wiring openings are provided in the electrical system space at positions higher than a base surface of said electrical system space.

5. The metal-air battery according to claim 1, wherein said water supply space and an electrical system space for controlling a battery output are provided on the upper case formed as a unit or as separate parts.

6. The metal-air battery according to claim 5, wherein a surface of said upper case on which said electrical system space is positioned is provided with a layout area with a connection hole for an external connection terminal.

7. The metal-air battery according to claim 5, wherein said metal-air battery cells and said upper case are separately provided, wherein said metal-air battery cells are each assembled to form said unit body, and wherein said upper case is installed onto said top surface of said unit body.

8. The metal-air battery according to claim 5, wherein a lid is provided on an upper surface of said upper case so that at least said water supply space is partly exposed.

9. The metal-air battery according to claim 2, wherein said wiring openings are provided at a position higher than a full water level of an electrolytic solution supplied in said water supply space.

10. The metal-air battery according to claim 2, wherein the upper case is provided with an electrical system space, for controlling a battery output, at a location separated from the water supply space by a wall, and wherein said wiring openings are provided in the electrical system space positions higher than a base surface of said electrical system space.

11. The metal-air battery according to claim 3, wherein the upper case is provided with an electrical system space, for controlling a battery output, at a location separated from the water supply space by a wall, and wherein said wiring openings are provided in the electrical system space at positions higher than a base surface of said electrical system space.

12. The metal-air battery according to claim 2, wherein said water supply space and an electrical system space for controlling a battery output are separated by a wall and are provided on the upper case formed as a unit or as separate parts.

13. The metal-air battery according to claim 3, wherein said water supply space and an electrical system space for controlling a battery output are separated by a wall and are provided on the upper case formed as a unit or as separate parts.

14. The metal-air battery according to claim 4, wherein said water supply space and an electrical system space for controlling a battery output are separated by a wall and are provided on the upper case formed as a unit or as separate parts.

15. The metal-air battery according to claim 6, wherein a lid is provided on an upper surface of said upper case so that at least said water supply space is partly exposed.

16. The metal-air battery according to claim 7, wherein a lid is provided on an upper surface of said upper case so that at least said water supply space is partly exposed.

17. The metal-air battery according to claim 6, wherein said metal-air battery cells and said upper case are separately provided, wherein said metal-air battery cells are each assembled to form said unit body, and wherein said upper case is installed onto said top surface of said unit body.

18. The metal-air battery according to claim 12, wherein a surface of said upper case on which said electrical system space is positioned is provided with a layout area with a connection hole for an external connection terminal.

19. The metal-air battery according to claim 13, wherein a surface of said upper case on which said electrical system space is positioned is provided with a layout area with a connection hole for an external connection terminal.

20. The metal-air battery according to claim 14, wherein a surface of said upper case on which said electrical system space is positioned is provided with a layout area with a connection hole for an external connection terminal.

* * * * *